United States Patent
Desposito et al.

(10) Patent No.: US 9,672,186 B2
(45) Date of Patent: Jun. 6, 2017

(54) ELECTRONIC MONITORING DEVICE HAVING WAKE-UP FOR DAISY CHAIN

(71) Applicants: Dominico Desposito, Toulouse (FR); Peter J. Bills, Scottsdale, AZ (US); Thierry Robin, Plaisance du Touch (FR)

(72) Inventors: Dominico Desposito, Toulouse (FR); Peter J. Bills, Scottsdale, AZ (US); Thierry Robin, Plaisance du Touch (FR)

(73) Assignee: NXP USA, Inc., Austin, TX (US)

( * ) Notice: Subject to any disclaimer, the term of this patent is extended or adjusted under 35 U.S.C. 154(b) by 293 days.

(21) Appl. No.: 14/548,604

(22) Filed: Nov. 20, 2014

(65) Prior Publication Data
US 2015/0370312 A1    Dec. 24, 2015

(30) Foreign Application Priority Data
Jun. 20, 2014    (WO) .................. PCT/IB2014/001345

(51) Int. Cl.
*G06F 1/32*   (2006.01)
*G06F 13/42*  (2006.01)

(52) U.S. Cl.
CPC ........ *G06F 13/4247* (2013.01); *G06F 1/3206* (2013.01)

(58) Field of Classification Search
CPC .................................................. G01R 31/3658
See application file for complete search history.

(56) References Cited

U.S. PATENT DOCUMENTS

| | | | | |
|---|---|---|---|---|
| 4,365,294 A * | 12/1982 | Stokken | ................ | G06F 9/3017 711/E12.081 |
| 4,751,634 A * | 6/1988 | Burrus, Jr. | .............. | G06F 13/34 710/13 |
| 5,938,742 A * | 8/1999 | Faddell | ................ | G06F 13/4256 710/260 |
| 6,098,144 A * | 8/2000 | De Oliveira | .......... | G06F 9/4812 710/269 |
| 2004/0199694 A1 * | 10/2004 | Yiu | ......................... | G06F 13/26 710/264 |

(Continued)

FOREIGN PATENT DOCUMENTS

WO    WO2008083093 A2    7/2008

*Primary Examiner* — Kim Huynh
*Assistant Examiner* — Danny Chan
(74) *Attorney, Agent, or Firm* — Charlene R. Jacobsen (57) ABSTRACT

A monitoring device has an event monitor, an uplink interface to a chain controller device, and a downlink interface to a further monitoring device, and a daisy controller for coupling the uplink to the chain downlink. The event monitor, in response to detecting an event in sleep mode, generates a wake-up signal. The daisy controller sets the electronic monitoring device to a wake-up request mode and disables the bidirectional data communication via the downlink interface, and subsequently transmits a wake-up request to the chain controller device via the uplink interface. In response to receiving a wake-up command, the daisy controller re-enables the bidirectional data communication via the downlink interface and sets the electronic monitoring device to the operational mode. Thereby a wake-up sequence is performed while the wake-up request mode avoids bus conflicts.

18 Claims, 6 Drawing Sheets

(56) References Cited

U.S. PATENT DOCUMENTS

| | | | | |
|---|---|---|---|---|
| 2008/0238432 A1* | 10/2008 | Botker | ............... | G01R 31/3658 |
| | | | | 324/434 |
| 2009/0073481 A1* | 3/2009 | Ferlitsch | ............ | H04N 1/00896 |
| | | | | 358/1.14 |
| 2009/0106469 A1* | 4/2009 | Perry | ...................... | G06F 13/24 |
| | | | | 710/268 |
| 2012/0254116 A1* | 10/2012 | Thereska | .......... | G06F 17/30091 |
| | | | | 707/640 |
| 2013/0073761 A1* | 3/2013 | Nierop | .............. | H04L 12/40045 |
| | | | | 710/110 |
| 2013/0124763 A1* | 5/2013 | Kessler | ............... | G06F 13/4295 |
| | | | | 710/110 |
| 2013/0187610 A1* | 7/2013 | Hayashi | .................... | H02J 7/00 |
| | | | | 320/118 |
| 2014/0223048 A1* | 8/2014 | Troeger | .............. | G06F 13/4282 |
| | | | | 710/106 |
| 2014/0265550 A1* | 9/2014 | Milligan | ................ | H04L 12/10 |
| | | | | 307/1 |
| 2015/0095537 A1* | 4/2015 | Sengoku | ............ | G06F 13/4295 |
| | | | | 710/110 |
| 2015/0287390 A1* | 10/2015 | Kakeko | ................... | H04L 12/28 |
| | | | | 345/1.1 |

* cited by examiner

ELECTRONIC MONITORING DEVICE HAVING WAKE-UP FOR DAISY CHAIN

CROSS REFERENCE TO RELATED APPLICATION(S)

The present application claims priority to International Patent Application No. PCT/IB2014/001345, entitled "ELECTRONIC MONITORING DEVICE HAVING WAKE-UP FOR DAISY CHAIN," filed on Jun. 20, 2014, the entirety of which is herein incorporated by reference.

FIELD OF THE INVENTION

This invention relates to an electronic monitoring device, a chain controller device, a method for controlling a daisy chain of electronic monitoring devices, integrated circuits, a monitoring system.

BACKGROUND OF THE INVENTION

International patent application publication WO 2008083093 describes a chip that detects wake-up events. A power management circuitry selectively provides power to a processor and to a I/O wake-up logic circuitry. The wake-up logic circuitry detects and responds to the wake-up events while power is provided by the I/O power supply. Multiple of such devices may be coupled in a daisy chain, each device having a wake-up network output to be coupled to a wake-up network input of a next device in the chain. The first device is coupled to a chain controller via the wake-up network input, and the last device in the chain may loop-back via its wake-up network output to a loopback input on a chain controller.

A drawback of the device disclosed in this prior art publication is that a daisy chain requires said loopback to verify whether the last device has actually detected said wake-up. Also it cannot be verified whether intermediate devices in the daisy chain have actually responded to the detected wake-up until communication from the chain controller device is again established.

SUMMARY OF THE INVENTION

The present invention provides an electronic monitoring device, a chain controller device, a method of controlling a daisy chain of multiple electronic monitoring devices, a monitoring system and an integrated circuit as further described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the Figs. are illustrated for simplicity and clarity and have not necessarily been drawn to scale. In the Figs., elements which correspond to elements already described may have the same reference numerals.

DETAILED DESCRIPTION OF THE PREFERRED EMBODIMENTS

Because the apparatus implementing the present invention is, for the most part, composed of electronic components and circuits known to those skilled in the art, circuit details will not be explained in any greater extent than that considered necessary for the understanding and appreciation of the underlying concepts of the present invention and in order not to obfuscate or distract from the teachings of the present invention.

In the examples in this document the event monitoring system is a battery monitoring system, but the event monitoring system may also be used to monitor other distributed events in other types of systems. A respective sensor may have an electronic monitoring device so it can react fast to external events. In such a system, low power consumption is useful because monitoring devices may be supplied by a battery. A low-power mode, e.g sleep mode during which the electronic monitoring device is powered down but not completely switched off to allows to quickly resume full-power operation, may be provided for reducing the overall power consumption of the event monitoring system, which is controlled to be in the sleep mode most of the time.

In many applications electronic monitoring devices are used for monitoring events, for example battery monitoring devices for automotive applications. Automotive battery systems may have a high voltage battery with multiple stacked cells that need to be monitored via a sensor. Monitoring devices may integrate precision voltage and current measurement with integrated passive cell balancing for up to, e.g., fourteen series electric batteries, and be used for monitoring events like Over Voltage, Under Voltage, Over Temperature, and may provide high speed communication with complete system diagnostics. Monitoring systems may support centralized and/or distributed battery management. Centralized battery monitoring systems may contain a controller module that senses individual differential cell voltages through a wiring harness. Distributed systems may locate multiple monitoring devices close to respective lithium ion batteries and utilize a bi-directional communication network to transfer data to a main controller unit (MCU). In monitoring systems monitoring devices may be connected in a daisy chain designed to support up to multiple remote nodes with a total bus wire length of several meters, e.g. 15 nodes across 5 meters.

To keep the number of connections low, a chain controller device, also called pack controller, can be connected to respective monitoring devices via a communication network usually a called daisy chain. The entire battery monitoring system may be controlled by the chain controller device. In the further examples, a daisy chain of four electronic monitoring devices and one pack controller is shown. However, it will be apparent that the chain may consist of any other number suitable for monitoring in the specific system. The respective electronic monitoring devices have an uplink daisy chain interface for data communication to the chain controller device and a downlink daisy chain interface for data communication with further electronic monitoring devices. Communication in the direction of the chain controller device may be called uplink or upstream, while communication in the direction away from the chain controller device may be called downlink or downstream.

In response to detecting an event, the event monitoring system can be woken up, e.g. by the event monitoring device detecting the event. The pack controller cannot react to the condition detected by the electronic monitoring device if in sleep mode. Thus, the electronic monitoring device may be arranged to wake-up the pack controller and enter the pack controller in its normal operational mode. Once in normal operational mode, the pack controller can interrogate the electronic monitoring device to manage the wake-up event. For example, upon detecting an event by the electronic monitoring device, the electronic monitoring device sends a wake-up message via its uplink daisy chain interface to the chain controller device, which may be in sleep mode. The message has to be passed on to the pack controller by the electronic monitoring devices upstream of the detecting event monitoring device via the respective uplink daisy chain interfaces. The upstream devices may also be in sleep mode, and may wake-up in response to receiving the wake-up message at their daisy chain downlink interface. Alternatively, the electronic monitoring devices may also pass on such messages when in sleep mode, and may switch to normal operational mode when receiving a wake-up confirmation at their uplink daisy chain interface.

In response to receiving the wake-up message the pack controller normally wakes up, and may send a response, e.g. a wake-up confirmation, to the originating electronic monitoring device, e.g. the device that earlier initiated the wake-up message. However, communication problems may occur. For example, if two electronic monitoring devices wake-up at the same time, the pack controller may not be able to recognize the wakeup message if both messages are placed on the data links of the communication network at the same time. Due to such a bus conflict neither of the wakeup messages may be decoded correctly. Also, due to noise on the data links, false wake-up messages may occur.

Traditional systems may have extra pins connected to further devices to wake-up the system. If one of the elements in the chain wants to wake-up it sets a one or a zero on a special pin indicating the pack controller to wake-up. Such extra pins and connections may be applied in systems were all the component are located close to each other. However, this approach requires multiple connections to the pack controller. Alternatively, a daisy chain system may be woken up periodically with a timer. However, this system causes unnecessary power consumption and slow response times.

The electronic monitoring devices in the chain may be provided with a daisy controller that temporarily disables the bidirectional data communication between the downlink interface and the uplink interface when the devices is in a wakeup mode (as a consequence of the device detecting a detected event), as is schematically indicated by switches in the following Figs. Thereby, devices get a priority depending on the position in the daisy chain, the devices nearest to the chain controller device having the highest priority. Accordingly, if two electronic monitoring devices want to communicate to the pack controller at the same time this priority mechanism manages the communication and avoids conflict between the different nodes.

Figure 1:
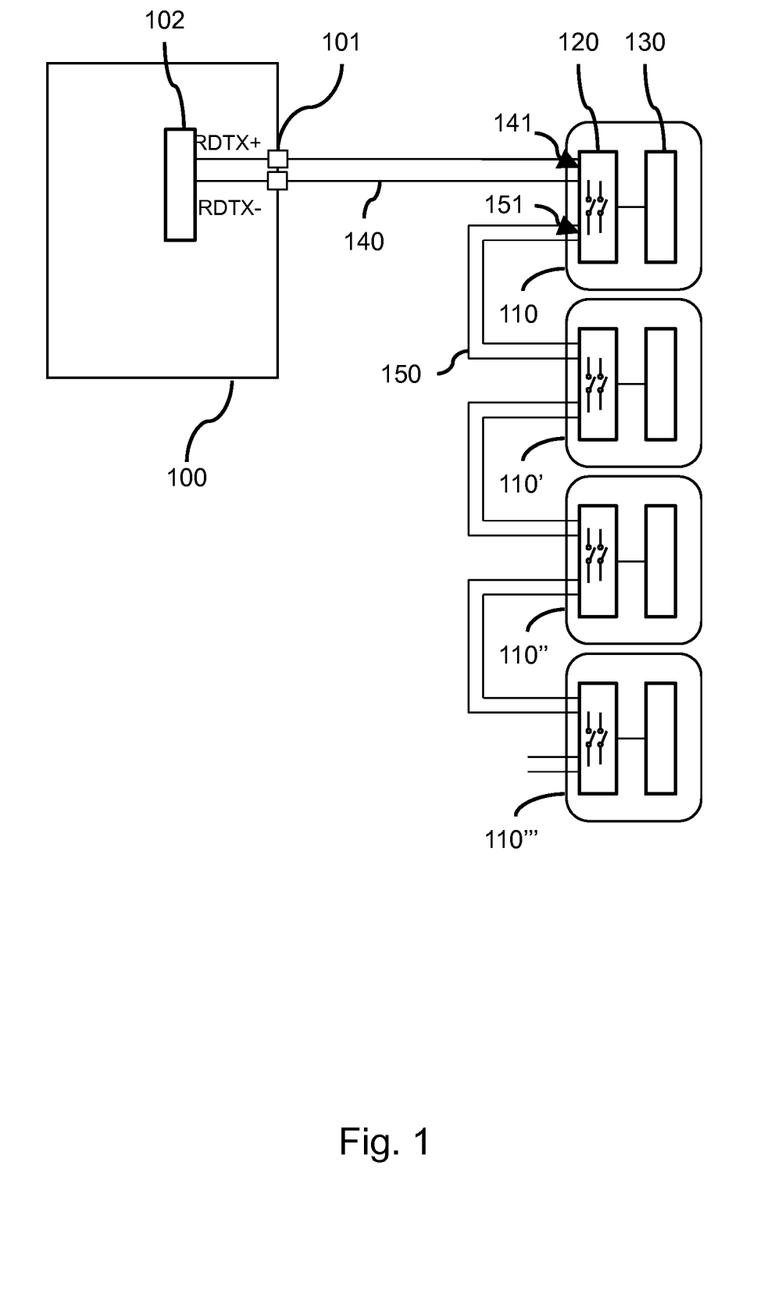
FIG. 1 shows a block diagram of an example of an electronic monitoring system having multiple electronic monitoring devices and a chain controller device.

FIG. 1 shows an example of an electronic monitoring system comprising a chain with multiple electronic monitoring devices 110, 110', 110'', 110''' and a chain controller device 100. The electronic monitoring devices are coupled in a so-called daisy chain starting with the chain controller device 100 at the upstream end of the chain, and comprising an interface controller 102 connected to a daisy chain downlink interface 101. The daisy chain downlink interface 101 is coupled via a data uplink 140 to a first, most upstream, electronic monitoring device 110, which is subsequently coupled via a data downlink 150 to a second electronic monitoring device 110'. Further electronic monitoring devices are coupled in said daisy chain via respective downlinks and uplinks. The most downstream electronic monitoring device 110''' in said daisy chain may have its daisy chain downlink interface 151 unconnected.

As illustrated with the electronic monitoring device 110 only for the sake of simplicity in the drawing, the electronic monitoring devices 110, 110', 110'', 110''' each comprises an event monitor 130 for detecting an event. Thereto the event monitor 130 may have respective measuring inputs, or may be coupled to a sensing circuit or an external sensor (not shown in the figure). The device has a daisy chain uplink interface 141 for bidirectional data communication in an upstream direction, across a data uplink 140 to the chain controller device 100, and a daisy chain downlink interface 151 for bidirectional data communication across a data downlink 150 in an downstream direction, to a further electronic monitoring device 110'. The device has a daisy controller 120 which couples the daisy chain uplink interface 141 to the daisy chain downlink interface 151 and the event monitor 130. The daisy controller 120 is arranged to control the electronic monitoring device 110 to be in a selected one of a low-power mode, a wake-up request mode and an operational mode. The low-power mode may e.g. be a sleep-mode or other mode in which the electronic monitoring device 110 consumes less power than in the normal operational mode and in which at least some units in the electronic monitoring device 110 are inactive.

When the electronic monitoring device 110 is in the low-power mode, events may be detected by the event monitor 130. The event monitor 130 is arranged to generate a wake-up signal, in response to detecting the event. The daisy controller 120 is arranged to, in response to receiving the wake-up signal when the electronic monitoring device 110 in the sleep mode, set the electronic monitoring device 110 to the wake-up request mode. The daisy controller 120 may also have a sleep mode and, when receiving the wake-up signal, initially switch itself to wake-up request mode and subsequently to operational mode.

The daisy controller 120 is arranged to, when the electronic monitoring device 110 is in the wake-up request mode, disable the bidirectional data communication via the downlink interface 151, e.g. by disabling I/O driver circuitry connected to the downlink interface 151 or otherwise. So any messages arriving on the downlink interface 151 are temporarily discarded. Subsequently a wake-up request is transmitted to the chain controller device 100 via the uplink interface 141. After the wake-up request has been transmitted, the bidirectional data communication via the downlink interface 151 may be re-enabled.

The chain controller device 100 receives the wake-up request, and may wake-up itself if in sleep mode when the wake-up request is received. The chain controller device 100 subsequently sends a wake-up command via is downlink interface 151. The wake-up command from the chain controller device 100 may be received via the uplink interface 141 by the daisy controller 120 of the electronic monitoring devices 110, 110', 110", 110''', and, in response to receiving the wake-up command, the electronic monitoring devices 110, 110', 110", 110''' may be controlled to be in an operational mode.

In an embodiment, the daisy controller 120 may wait, still in wake-up request mode, for a response message from the chain controller device 100, e.g. receiving a wake-up command from the chain controller device 100 via the uplink interface 141. The daisy controller 120 may be arranged to re-enable the bidirectional data communication via the downlink interface 151 in response to receiving the wake-up command, and to subsequently switch to operational mode by setting all circuits of the electronic monitoring device 110 to the operational mode.

For example, when events are detected substantially simultaneously by multiple electronic monitoring devices, e.g. the second and third electronic monitoring devices 110', 110", the electronic monitoring devices may disable the data communication with the respective downlink interface 151. Accordingly, the most upstream one of the event detecting electronic monitoring devices, e.g. the second electronic monitoring device successfully sends a wakeup message via its uplink interface 141, via the first electronic monitoring device, to the chain controller device 100. The event detecting electronic monitoring devices downstream of the most upstream one, e.g. the third electronic monitoring device, also send a wakeup message but these are discarded by the electronic monitoring devices more upstream (e.g. by the second electronic monitoring device) when received on the downlink interface 151. The pack controller 100 may now send wake-up commands to all electronic monitoring devices, or a general wakeup command to be executed by each electronic monitoring device. Thereby conflicts on the bus can be avoided, while all electronic monitoring devices are woken up.

The methodology is based on different phases when proceeding from sleep mode, via wake-up request mode to operational mode. Initially an event may be detected during sleep mode. Subsequently, in a first phase the pack controller 100 will be woken up. During a second phase the pack controller 100 will manage the exit from sleep mode of the other elements of the chain. The pack controller 100 is in operational (high power) mode after receiving the wakeup message in the first phase. Subsequently, in the second phase, the pack controller 100 responds by sending a response message in the downlink direction so any component is enabled to switch to operational mode from either the sleep mode or the wakeup mode. A component in wake-up request mode and receiving such response message will close its respective switches and re-enable the data communication on the downlink interface 151, so the response message is heard by all components connected in the daisy chain. A respective electronic monitoring device that switches to operational mode may send a wakeup conformation message.

With the proposed system bus conflicts on a daisy chain network may be avoided without adding extra pins or a loopback connection. The monitoring system is event based and not time based and for this reason each element of the line can wake-up the network if it is needed. Accordingly, monitoring system is suitable for large systems, e.g. comprising several tens or hundreds of event monitoring units, it. In an embodiment, it is possible to apply specific wake-up commands to specific monitoring devices, which reduces false or unnecessary wake-up. For instance, selective wake-up of only some of the electronic monitoring devices in the chain may be performed by e.g. sending an individual wake-up command specific for a specific (subset of) electronic monitoring device in the chain.

In an embodiment of the electronic monitoring device, the daisy controller 120 is arranged to, in response to receiving the wake-up command from the chain controller device 100 via the uplink interface 141, transmit a wake-up confirmation to the chain controller device 100 via the uplink interface 141. Sending the confirmation enables the chain controller device 100 to actually determine whether the electronic monitoring device has woken up.

In an embodiment, the daisy controller 120 is arranged to transmit a wake-up request comprising a device identifier which identifies a specific electronic monitoring device or set of devices. The device identifier may, for example, be a device address, a device code or name. Such identifier may be fixed, or may be programmable during production or configuration of the electronic monitoring device, or may be assigned by the pack controller 100 during initialization of the system. The electronic monitoring device may in such a case comprise a daisy controller 120 which, in response to receiving the wake-up command comprising the device identifier for that specific electronic monitoring device, re-enables the bidirectional data communication via the downlink interface 151 and sets the electronic monitoring device to the operational mode. If the wake-up command does not comprise the device identifier identifying the electronic monitoring device (or a group of which it is part) the daisy controller 120 ignores the wake-up command. Thus, the device identity may be used to only respond to a command containing the correct identity for example.

In an embodiment, the daisy controller 120 is arranged to, in response to receiving the wake-up command, transmit a wake-up confirmation comprising a device identifier to the chain controller device 100 via the uplink interface 141. Thereby, the chain controller device 100 can verify that the intended electronic monitoring devices is woken-up and in the normal operational mode.

In an embodiment, the daisy controller 120 is arranged to, in the wake-up request mode, disable the bidirectional data communication by discarding any wake-up request received via the downlink interface 151, while forwarding other messages received via the downlink interface 151 to the uplink interface 141. Thereby, data communication may partly be disabled, i.e. only for the wake-up messages, thereby allowing e.g. a downstream electronic monitoring device to communicate with devices upstream of the daisy controller 120. Furthermore, in the electronic monitoring device, the daisy controller 120 may be arranged to, in the wake-up request mode, perform said disabling the bidirectional data communication by discarding messages received at the downlink interface 151, while forwarding messages received at the uplink interface 141 to the downlink interface 151. Thereby communication in a downstream direction remains possible and e.g. the pack controller 100 remains capable of sending instructions to devices downstream of the daisy controller.

In an embodiment, the event monitor 130 is connectable to a battery and the event is a predefined battery condition of the battery. For example, the predefined battery condition may be at least one of a battery voltage being below a predefined low voltage value; a battery voltage being above a predefined high voltage value; a battery current being below a predefined low current value; a battery current being above a predefined high current value; a battery temperature being above or below a predetermined boundary value or an IC die temperature being above a predefined boundary value. Different events or wake-up conditions may be monitored by a single monitoring device. Also, different events may be represented by different bits in a wake-up message or in a wake-up register. The wake-up message may be transferred to the chain controller device 100 via daisy chain, e.g. in the wake-up request. A wake-up mask may be used to allow a user to mask selected events from waking up the respective device.

Figure 2:
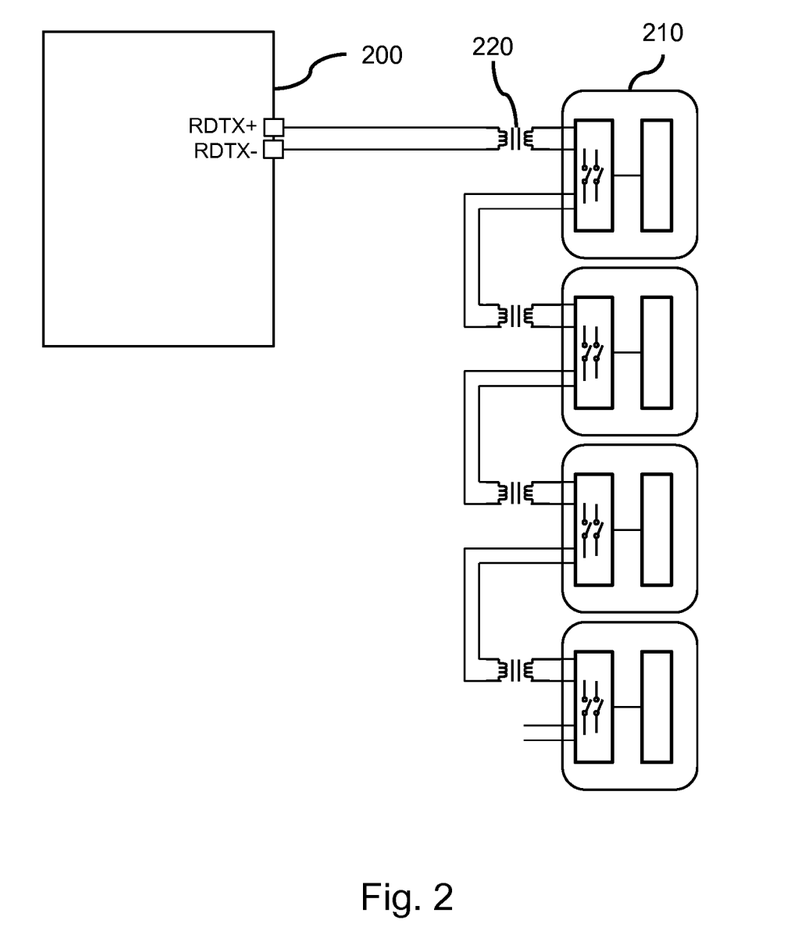
FIG. 2 shows a block diagram of an example of an event monitoring system having electronic monitoring devices coupled in a daisy chain via transformers.

FIG. 2 shows an example of an event monitoring system having electronic monitoring devices 210 coupled in a daisy chain via transformers. The electronic monitoring system has multiple electronic monitoring devices 210 and a chain controller device 200. The electronic monitoring devices are coupled in a daisy chain starting with the chain controller device coupled via a data uplink and a transformer 220 to a first electronic monitoring device 210, which is subsequently coupled via a data downlink and a further transformer to a second electronic monitoring device. Further electronic monitoring devices are coupled in said daisy chain via respective transformers. The daisy chain in the monitoring system comprises at least one isolating transformer having a first winding coupled to a respective downlink interface and having a second winding coupled to a subsequent uplink interface.

In a practical example the transformers may be automotive qualified transformers, e.g. rated at 3750 Vrms. Using such pulse transformers may allow the monitoring system to achieve communication rates of 2 MHz with very low radiated emissions. Magnetic coupling via transformers requires the communication signals to be true differential which also reduces radiated emissions while providing isolation. A physical layer transformer interface circuit in the pack controller creates a pulse phase modulated signal that is transmitted to the bus through the transformer. In the electronic monitoring device the daisy chain interface may, in the physical layer interface circuit, be equipped with an automatic termination resistor for impedance matching and network stability.

In an embodiment, as shown in FIGS. 1 and 2, the daisy controller may be provided with switches to couple the uplink daisy chain interface to the downlink daisy chain interface. In sleep mode, the switches may be closed to directly connect the uplink daisy chain interface to the downlink daisy chain interface. To improve communication efficiency the physical layer termination resistors may be opened when the bus switches are closed. After initialization, the electronic monitoring device may enter a sleep mode, and be commanded to close the internal bus switches and allow the Pack Controller 200 to communicate to the next electronic monitoring device 210 in the daisy chain.

Figure 3:
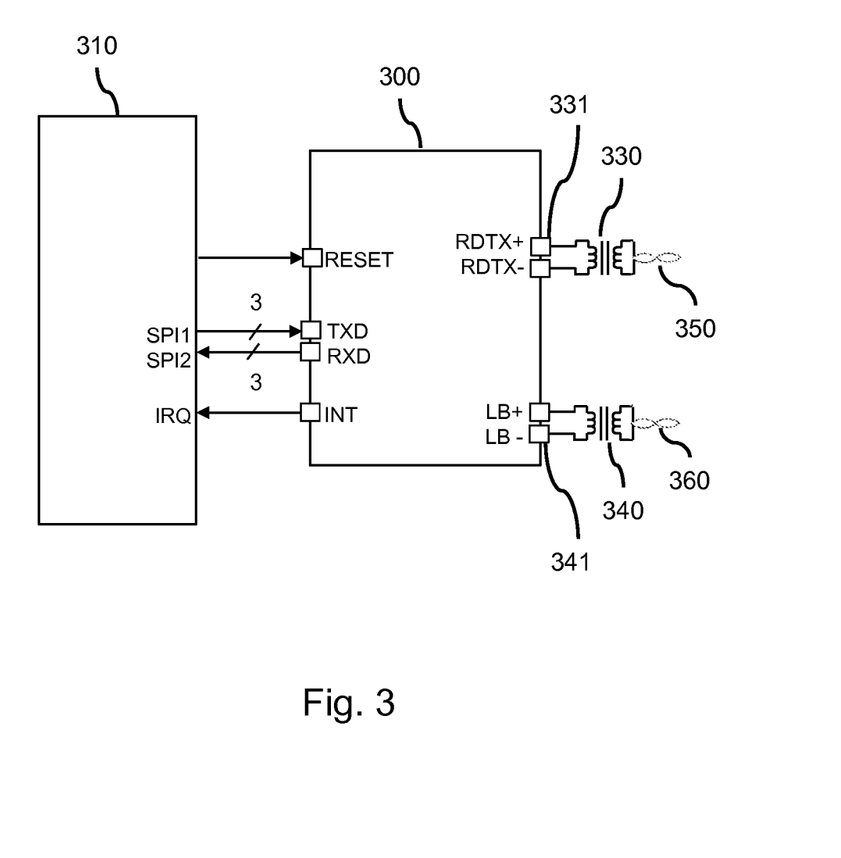
FIG. 3 shows a block diagram of an example of a chain controller device.

FIG. 3 shows an example of a chain controller device. The chain controller device has a daisy chain interface controller 300 coupled to a processor 310 (e.g. a microprocessor such as a general purpose microprocessor, microcontroller or otherwise) for controlling a daisy chain of multiple electronic monitoring devices as described above. The chain controller device has a daisy chain downlink interface 331 arranged to be coupled to the uplink interface of a first device of the electronic monitoring devices 110,210 in the daisy chain for enabling bidirectional data communication. Two connectors RDTX+ and RDTX− of the downlink interface are coupled to a first winding of a transformer 330, which transformer has a second winding coupled to a two wire bi-directional bus 350, e.g. a half duplex bus. The interface controller 300 couples the daisy chain downlink interface 331 to the processor 310. In the Fig., the processor 310 has a reset output which is coupled to a reset input RESET of the controller, while the processor 310 has an interrupt request input IRQ which is coupled to an interrupt output INT of the controller. The processor 310 further has a first 3 wire serial parallel interface SPI1 which is coupled to a first 3 wire serial parallel interface TXD of the controller, and a second 3 wire serial parallel interface SPI2 which is coupled to a second 3 wire serial parallel interface RXD of the controller.

The interface controller 300 is arranged to receive a wake-up request from one of the multiple electronic monitoring devices via the uplink interface of the first electronic monitoring device coupled to the bidirectional bus 350. The wake-up request may be detected and an interrupt signal to the processor may be generated. The received request may be transferred via SPI2 to the processor. The processor may initiate a wake-up process and generate a wakeup command via the SPI1, for example by executing an interrupt service routine or interrupt handler corresponding to the interrupt signal. Subsequently the interface controller 300 transmits the wake-up command to the daisy chain via the uplink interface of the first electronic monitoring device.

In an embodiment, in the chain controller device the interface controller 300 may be arranged to, after transmitting the wake-up command, receive a wake-up confirmation. The wake-up confirmation may be processed by the processor to determine whether all component of the daisy chain have woken up.

In an embodiment, the interface controller 300 is arranged to, in response to transmitting the wake-up command and not receiving the wake-up confirmation within a predetermined period of time, re-transmit the wake-up command to the daisy chain via the uplink interface of the first electronic monitoring device.

In an embodiment, a specific handshake protocol is proposed. The pack controller may send the wakeup command and the electronic monitoring device has to respond by a wakeup confirmation. The pack controller may resend the wakeup command until he receives the specific response from the addressed electronic monitoring device. So, when no response is received for a predetermined period, the same wakeup command is resend. Now the respective component may be in wakeup or operational mode, and may respond by sending the wakeup confirmation. The specific handshake protocol allows obviating the following situation. Once the pack controller sends wake-up commands to the elements of the chain, an electronic monitoring device still in sleep mode could detect an event. The one monitoring device may switch to wake-up request mode and try to communicate on the bus sending a wake-up message, simultaneous to the pack controller sending the wakeup command. Such a wakeup message may interfere with the wakeup command as send by the pack controller. By resending the wakeup command until receiving the wakeup confirmation from the addressed electronic monitoring device the pack controller can verify that all devices are in the operational mode.

In an embodiment, in the chain controller device the interface controller 300 is arranged to, in response to receiving to wake-up request comprising a device identifier of the specific electronic monitoring device that sent the request, transmit a wake-up command identifying that specific electronic monitoring device as well to the daisy chain via the uplink interface of the first electronic monitoring device. So the request and the command may be made specific for the respective electronic monitoring device that has detected an event. Additionally, the interface controller 300 may be arranged to, in response to transmitting the wake-up command, receive via the uplink interface of the first electronic monitoring device a wake-up confirmation identifying the specific electronic monitoring device that sent the confirmation, e.g. by including in the confirmation a suitable device identifier. Thus the chain controller device can determine whether a specific component has woken up.

The interface controller 300 shown in FIG. 3 may further be provided with a second daisy chain interface, called an uplink daisy chain interface or loopback interface 341. Two loopback connectors LB+ and LB− of the uplink interface are coupled to a first winding of a transformer 340, which transformer has a second winding coupled to a loopback two wire bi-directional bus 360, e.g. a half duplex bus. So, the transformer daisy chain network may be provided with a loop back of the last, most downstream, electronic monitoring device in the daisy chain to the Pack Controller via the further transformer 340. This allows the chain controller device to verify communication to each node in the daisy chain with transformer isolation. Hence, the system may be used in a closed loop systems having a loop back connection from the last electronic monitoring device in the daisy chain back to the chain controller device. Moreover, the system may be used for other types of data communication, i.e. not only for wake-up communication.

Figure 4:
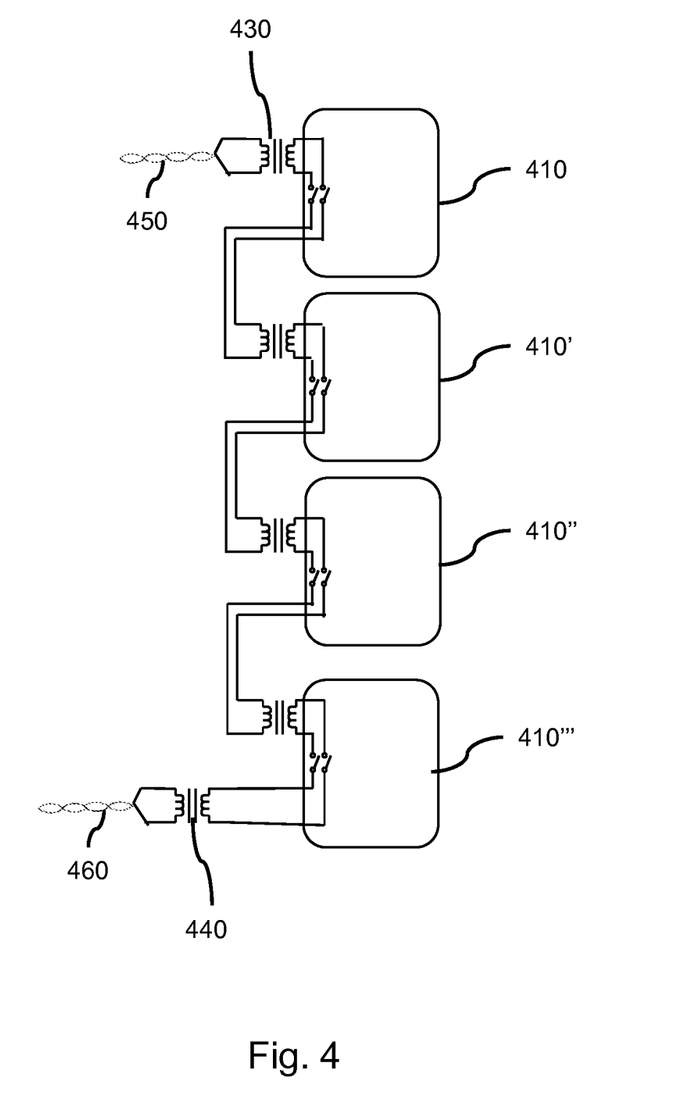
FIG. 4 shows a block diagram of an example of a daisy chain of multiple electronic monitoring devices.

FIG. 4 shows an example of a daisy chain of multiple electronic monitoring devices 410, 410', 410", 410'''. A first, most upstream, electronic monitoring device 410 is coupled to a first transformer 430 to a first winding thereof. The transformer has a second winding coupled to a two wire bi-directional bus 450 to a chain controller device (such as in FIG. 3 for example), e.g. a half duplex bus. The first electronic monitoring device 410 is coupled via its downlink interface and a transformer to the uplink interface of a second, more downstream, electronic monitoring device 410'. Similarly the second electronic monitoring device is coupled to a third electronic monitoring device 410" and finally to a fourth, last and most downstream in the chain, electronic monitoring device 410'''. For providing a loopback interface the last electronic monitoring device has its downlink interface coupled to a final transformer 440 to a first winding thereof. The final transformer has a second winding coupled to a two wire bi-directional bus 460 to loopback interface of a chain controller device.

In practice, the communication protocol in the electronic monitoring system may be implemented as follows. As a wakeup message from the electronic monitoring device one or two pulses may be send on the uplink interface. The pack controller may receive the request, and respond in the wakeup sequence by sending two consecutive pulses in the downstream direction as a wake-up command. Subsequently, the pack controller checks if the respective electronic monitoring device is in high power state by sending an addressed command. The addressed electronic monitoring device may now respond to the addressed command by sending a confirmation that carries the identity of the addressed electronic monitoring device.

Figure 5:
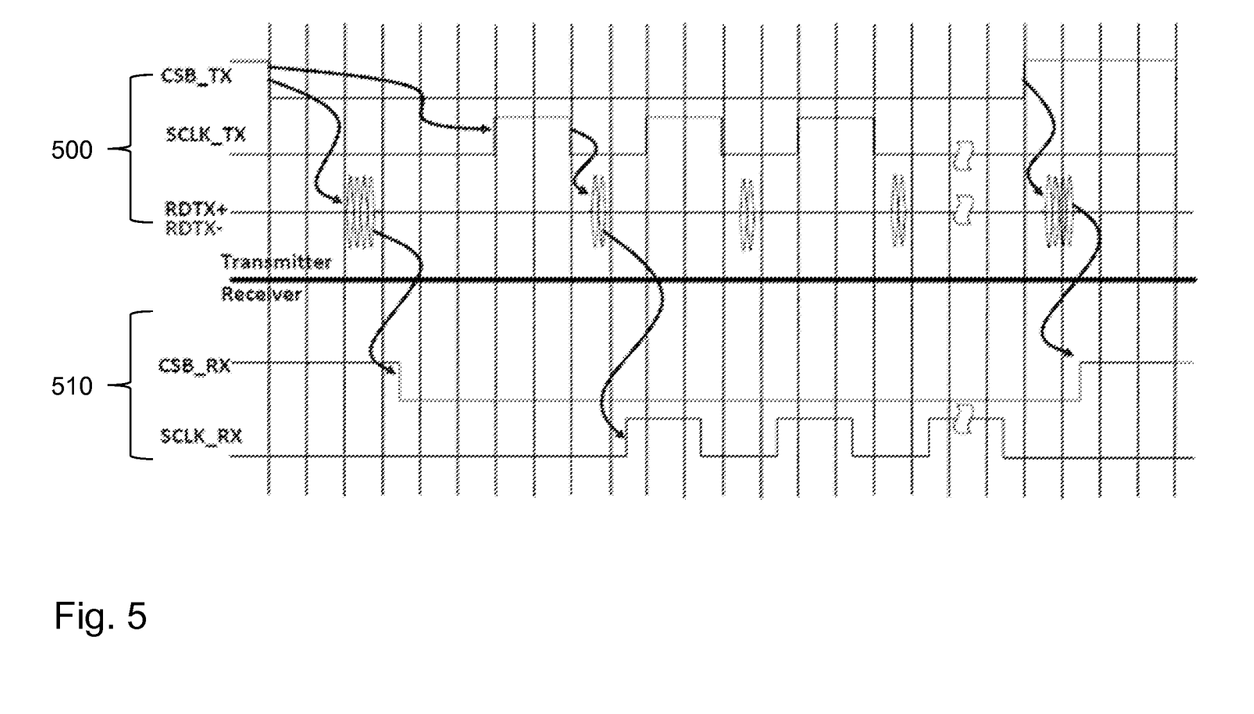
FIG. 5 shows timing diagram an example of data communication on a bidirectional bus in a daisy chain.

FIG. 5 shows a timing diagram for an example of data communication on a bidirectional bus in a daisy chain. An upper graph schematically represents transmitted data 500 and a lower graph represents received data 510. The transmitted data has a data signal CSB_TX and a clock signal SCLK_TX, which are translated into an analog pulsed bus signal RDTX+ and RDTX−, as indicated by curved arrows. The analog pulsed bus signal is outputted from a transceiver interface of an uplink or downlink daisy chain interface of an electronic monitoring device or chain controller device, in an embodiment via a transformer, to a bidirectional bus. The received bus signal is inputted to a transceiver interface of an uplink or downlink daisy chain interface and is translated from the pulsed bus signal into a data signal CSB_RX and a clock signal SCLK_RX. Analog signals of transmitted data 500 on said bidirectional bus are shown as sine wave shape pulses, for example a Start of Message signal SOM, which corresponds to a double pulse. After the SOM signal data bits are transmitted. Such a bus enables half duplex bidirectional data communication. The proposed wake-up system avoids putting several signals simultaneously on the bus, by temporarily disconnecting the downlink and uplink interface in the electronic monitoring device, as explained above. So it is avoided that the analog signals as shown are put on the bidirectional bus simultaneously, i.e. avoiding interference and incorrect demodulation.

Moreover, the analog, pulse shaped, signals as shown are easily detected and hence may serve to represent the wakeup message and wakeup command.

An integrated circuit may comprise one or more electronic monitoring devices as described above. Furthermore, an integrated circuit may comprise at least one chain controller device as described above. Also, a chain controller device and a electronic monitoring device may be combined in a single integrated circuit, e.g. comprising one or more dies provided in a common integrated circuit package or housing.

Figure 6:
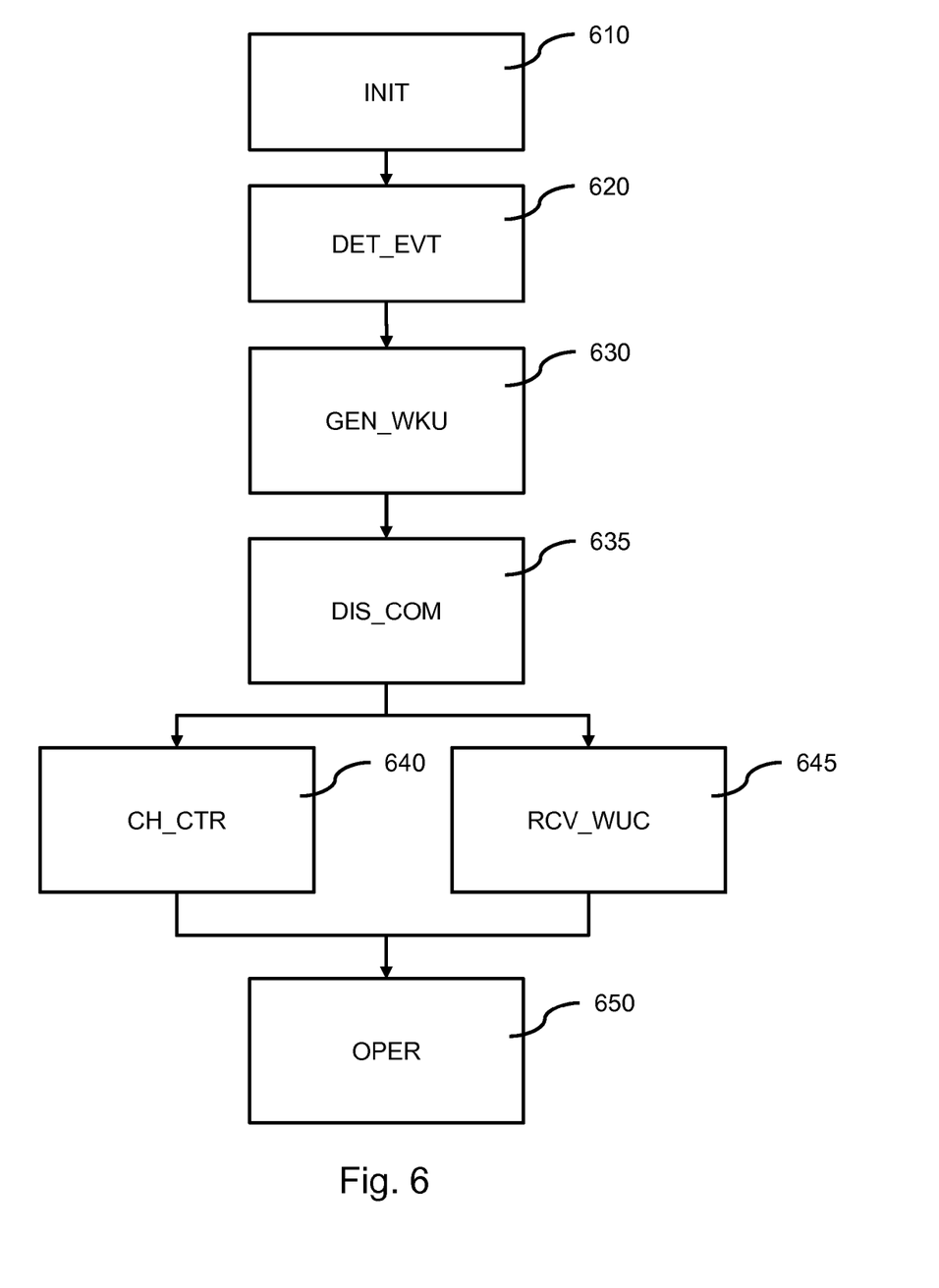
FIG. 6 shows a flow-chart of an example of a method of controlling a daisy chain of multiple electronic monitoring devices.

FIG. 6 shows a flow chart of an example of a method of controlling a daisy chain of multiple electronic monitoring devices. The monitoring devices are controlled via a daisy chain downlink interface of a chain controller device coupled to the uplink interface of a first device of the electronic monitoring devices in the daisy chain, the interface enabling bidirectional data communication.

The method starts, as shown with block INIT 610, by initiating the respective devices, e.g. by resetting the devices to engage sleep mode. Then, as shown in block DET_EVT 620, the method detects an event that has to be monitored, e.g. a battery condition that exceeds a boundary value. Then, as shown block GEN_WKU 630, the method continues, in response to detecting the event in a respective electronic monitoring device, by generating a wake-up signal in the respective electronic monitoring device and setting the respective electronic monitoring device to the wake-up request mode. Next, during the wake-up request mode, the bidirectional data communication via the downlink interface of the respective electronic monitoring device is disabled, as shown in block DIS_COM 635, and a wake-up request is transmitted to the chain controller device via the uplink interface of the respective electronic monitoring device. Subsequently, in the chain controller device in block CH_CTR 640, the method continues by receiving the wake-up request via the downlink interface of the chain controller device, and transmitting a wake-up command to the daisy chain via the downlink interface of the chain controller device. In parallel, at the respective electronic monitoring device, as shown in block RCV_WUC 645, the wake-up command is received via the uplink interface. Finally in the respective electronic monitoring device, as shown in block OPER 650, in response to receiving the wake-up command, the bidirectional data communication is re-enabled via the downlink interface and the electronic monitoring device is set to the operational mode.

In the foregoing specification, the invention has been described with reference to specific examples of embodiments of the invention. It will, however, be evident that various modifications and changes may be made therein without departing from the broader scope of the invention as set forth in the appended claims and the specific examples are merely illustrative and not limiting to the invention. For example, instead of four electronic monitoring devices any other number of electronic monitoring devices may be present. Likewise, the connections may be a type of connection suitable to transfer signals from or to the respective nodes, units or devices, for example via intermediate devices, and instead of SPI other interfaces may be used to connect the processor 310 to the daisy chain interface controller. Accordingly, unless implied or stated otherwise the connections may for example be direct connections or indirect connections. Likewise, instead of transformers other suitable types of couplings may be used to connect the electronic monitoring devices in the daisy chain, and instead of bus (such as a twisted wire bus) another suitable connection may be used.

Furthermore, although the invention has been described with respect to specific conductivity types or polarity of potentials, skilled artisans appreciated that conductivity types and polarities of potentials may be reversed.

Furthermore, the devices may be physically distributed over a number of apparatuses, while functionally operating as a single device. Furthermore, the units and circuits may be suitably combined in one or more semiconductor devices, and e.g. be provided as an integrated circuit comprising one or more dies provided in a common package. However other modifications within the scope of the claims are likewise possible.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic monitoring device, the device comprising:
   an event monitor for detecting an event;
   a daisy chain uplink interface for enabling bidirectional data communication to a chain controller device;
   a daisy chain downlink interface for enabling bidirectional data communication to a further electronic monitoring device;
   a daisy controller for coupling the daisy chain uplink interface to the daisy chain downlink interface and the event monitor;
   the daisy controller being arranged to control the electronic monitoring device to be in a selected mode out of: a low-power mode, a wake-up request mode and an operational mode;
   the electronic monitoring device consuming in the low-power mode less power than in the operational mode;
   the event monitor being arranged to, in response to detecting the event when the electronic monitoring device is in the low-power mode, generating a wake-up signal;
   the daisy controller being arranged to, in response to receiving the wake-up signal in the low-power mode, control the electronic monitoring device to be in the wake-up request mode;
   the daisy controller being arranged to, when the electronic monitoring devices is in the wake-up request mode:
      disable the bidirectional data communication via the downlink interface;
      subsequently transmit a wake-up request to the chain controller device via the uplink interface;
      re-enable the bidirectional data communication via the downlink interface, and
      receive a wake-up command from the chain controller device via the uplink interface, and, in response to receiving the wake-up command, control the electronic monitoring device to be in the operational mode.

2. Electronic monitoring device as claimed in claim 1, the daisy controller being arranged to, in response to receiving the wake-up command, perform at least one of:
   re-enable the bidirectional data communication via the downlink interface;
   transmit a wake-up confirmation to the chain controller device via the uplink interface.

3. Electronic monitoring device as claimed in claim 1, the wake-up request comprises a device identifier identifying the specific electronic monitoring device in which the event was detected.

4. Electronic monitoring device as claimed in claim 2, wherein the daisy controller is arranged to, in response to receiving a wake-up command comprising a device identifier corresponding to the specific electronic monitoring device in which the daisy controller is present, re-enabling the bidirectional data communication via the downlink interface and setting the electronic monitoring device to the operational mode.

5. Electronic monitoring device as claimed in claim 4, the daisy controller being arranged to, in response to receiving the wake-up command, transmit a wake-up confirmation comprising the identifier to the chain controller device via the uplink interface.

6. Electronic monitoring device as claimed in claim 1, wherein said disabling the bidirectional data communication in the wake-up request mode comprises the daisy controller discarding any wake-up request received via the downlink interface, while forwarding other messages received via the downlink interface to the uplink interface.

7. Electronic monitoring device as claimed in claim 1, wherein said disabling the bidirectional data communication in the wake-up request mode comprises the daisy controller discarding messages received via the downlink interface, while forwarding messages received via the uplink interface to the downlink interface.

8. Electronic monitoring device as claimed in claim 1, the event monitor being connectable to a battery, and the event being a predefined battery condition of the battery.

9. Electronic monitoring device as claimed in claim 8, the predefined battery condition comprising at least one of
   a battery voltage being below a predefined low voltage value;
   a battery voltage being above a predefined high voltage value;

a battery current being below a predefined low current value;

a battery current being above a predefined high current value;

a battery temperature being above a predefined boundary value;

a battery temperature being below a predefined boundary value;

a IC die temperature of an IC die on which the electronic monitoring device is provided being above a predefined boundary value.

10. Electronic monitoring device as claimed in claim 1, wherein the chain controller device comprises:

a daisy chain downlink interface to be coupled to the uplink interface of a first device of the electronic monitoring devices in the daisy chain for enabling bidirectional data communication, and an interface controller connected to the daisy chain downlink interface and arranged to, in response to receiving a wake-up request from one of the multiple electronic monitoring devices via the uplink interface of the first electronic monitoring device, transmit a wake-up command to the daisy chain via the uplink interface of the first electronic monitoring device.

11. Electronic monitoring device as claimed in claim 10, wherein the interface controller is arranged to receive a wake-up confirmation sent by the electronic monitoring devices after transmitting the wake-up command.

12. Electronic monitoring device as claimed in claim 11, wherein the interface controller is arranged to, if the wake-up confirmation is not received within a predetermined period after transmitting the wake-up command, re-transmitting the wake-up command.

13. Electronic monitoring device as claimed in claim 11, wherein the interface controller is arranged to in response to receiving a wake-up request comprising a device identifier of a specific electronic monitoring device, transmit a wake-up command comprising that device identifier to the daisy chain via the uplink interface of the first electronic monitoring device.

14. Electronic monitoring device as claimed in claim 11, wherein the interface controller is arranged to:

receive a wake-up confirmation comprising the device identifier of the respective electronic monitoring device that received the wake-up command.

15. Electronic monitoring device as claimed in claim 1, further comprising an isolating transformer having a first winding coupled to the daisy chain downlink interface and having a second winding coupled to a daisy chain uplink interface of a second electronic monitoring device.

16. Electronic monitoring device as claimed in claim 1, wherein the device comprises an integrated circuit.

17. Electronic monitoring device as claimed in claim 10, wherein the chain controller comprises an integrated circuit.

18. A method of controlling a daisy chain of multiple electronic monitoring devices via a daisy chain downlink interface of a chain controller device coupled to the uplink interface of a first device of the electronic monitoring devices in the daisy chain for enabling bidirectional data communication, the method comprising:

in response to detecting an event by a first electronic monitoring device:
generating a wake-up signal in the first electronic monitoring device;
controlling the first electronic monitoring device to be in a wake-up request mode;
disabling bidirectional data communication via a downlink interface of the first electronic monitoring device;
transmitting a wake-up request to the a chain controller device via an uplink interface of the first electronic monitoring device; and
re-enabling the bidirectional data communication via the downlink interface of the first electronic monitoring device; and in response to receiving the wake-up request at the chain controller device via a downlink interface of the chain controller device, transmitting a wake-up command to the first electronic monitoring device via the downlink interface of the chain controller device; and receiving the wake-up command in the first electronic monitoring device via the uplink interface of the first electronic monitoring device and controlling the first electronic monitoring device to be in an operational mode.

\* \* \* \* \*